US007410710B2

(12) United States Patent
Mirkovic et al.

(10) Patent No.: US 7,410,710 B2
(45) Date of Patent: Aug. 12, 2008

(54) FIRSTOUT SHUTDOWN TRACING FOR FUEL PROCESSOR CONTROL SYSTEM

(75) Inventors: Vesna R. Mirkovic, Pearland, TX (US); W. Spencer Wheat, Missouri City, TX (US)

(73) Assignee: Texaco Inc., San Ramon, CA (US)

( * ) Notice: Subject to any disclaimer, the term of this patent is extended or adjusted under 35 U.S.C. 154(b) by 636 days.

(21) Appl. No.: 10/407,259

(22) Filed: Apr. 4, 2003

(65) Prior Publication Data

US 2004/0197238 A1   Oct. 7, 2004

(51) Int. Cl.
*H01M 8/00* (2006.01)
*H01M 8/04* (2006.01)
*H01M 8/12* (2006.01)
*H01M 10/44* (2006.01)

(52) U.S. Cl. .............................. 429/12; 429/13; 429/19; 429/22; 429/23; 429/24; 429/25; 429/27; 429/29; 429/30; 429/50

(58) Field of Classification Search .................. 429/12, 429/13, 19, 22, 23, 24, 25, 27, 29, 30, 50
See application file for complete search history.

(56) References Cited

U.S. PATENT DOCUMENTS

| | | | |
|---|---|---|---|
| 4,673,624 A | 6/1987 | Hockaday | |
| 5,383,201 A | 1/1995 | Satterlee et al. | |
| 5,731,101 A | 3/1998 | Sherif et al. | |
| 5,827,602 A | 10/1998 | Koch et al. | |
| 6,534,950 B2 | 3/2003 | LeBoe | |
| 6,682,838 B2 | 1/2004 | Stevens | |
| 6,759,156 B1 * | 7/2004 | Wheat et al. | 429/19 |
| 6,792,341 B2 | 9/2004 | Hunt et al. | |
| 6,824,577 B2 | 11/2004 | Deshpande | |
| 6,838,199 B2 * | 1/2005 | Balliet et al. | 429/13 |
| 6,838,200 B2 * | 1/2005 | Goebel et al. | 429/20 |
| 6,858,336 B2 * | 2/2005 | Reiser et al. | 429/13 |
| 6,887,285 B2 | 5/2005 | Deshpande | |
| 6,905,791 B2 * | 6/2005 | Busenbender | 429/13 |
| 6,913,845 B2 * | 7/2005 | Bekkedahl et al. | 429/18 |

(Continued)

FOREIGN PATENT DOCUMENTS

EP   1 067 614   1/2001

OTHER PUBLICATIONS

Suarez et al., "Synthesis and physical-chemical properties of ionic liquids based on 1-*n*-butyl-3-methylimidazolium cation," *J. Chim. Phys.* 95:1626-1639 (1998).

(Continued)

*Primary Examiner*—Brian J Sines
(74) *Attorney, Agent, or Firm*—Williams Morgan & Amerson; Frank C. Turner; Melissa Potangia

(57) ABSTRACT

A method and apparatus for determining which condition in a fuel processor has initiated a shutdown of the fuel processor are disclosed. In general, the apparatus generates a plurality of shutdown initiator signals, each corresponding to one of a plurality of shutdown conditions and indicating whether such condition is present. The shutdown initiator signals are read within a predetermined window. At least one of the read shutdown initiator signals indicates that a corresponding first shutdown condition has occurred and identifies the corresponding first shutdown condition as the firstout.

39 Claims, 8 Drawing Sheets

U.S. PATENT DOCUMENTS

| | | |
|---|---|---|
| 2002/0083646 A1 | 7/2002 | Deshpande et al. |
| 2002/0088740 A1 | 7/2002 | Krause et al. |
| 2002/0090326 A1 | 7/2002 | Deshpande |
| 2002/0090327 A1 | 7/2002 | Deshpande |
| 2002/0090328 A1 | 7/2002 | Deshpande |
| 2002/0090334 A1 | 7/2002 | Stevens et al. |
| 2002/0094310 A1 | 7/2002 | Krause et al. |
| 2002/0098129 A1 | 7/2002 | Martin et al. |
| 2002/0155329 A1 | 10/2002 | Stevens |

OTHER PUBLICATIONS

Wilkes et al., "Air and Water Stable 1-Ethyl-3-methylimidazolium Based Ionic Liquids," *J. Chem. Soc., Chem. Commun.* 965-967 (1992).

Fannin, Jr. et al., "Properties of 1,3-Dialkylimidazolium Chloride—Aluminum Chloride Ionic Liquids. 2. Phase Transitions, Densities, Electrical Conductivities, and Viscosities," *J. Phys. Chem.* 88:2614-2621 (1984).

Fuller et al., "Structure of 1-Ethyl-3-methylimidazolium Hexafluorophosphate: Model for Room Temperature Molten Salts," *J. Chem. Soc., Chem. Commun.* 299-300 (1994).

Bowlas et al., "Liquid-crystalline ionic liquids," *Chem. Commun.* 1625-1626 (1996).

Bonhôte et al., "Hydrophobic, Highly Conductive Ambient-Temperature Molten Salts," *Inorg. Chem.* 35:1168-1178 (1996).

\* cited by examiner

FIRSTOUT SHUTDOWN TRACING FOR FUEL PROCESSOR CONTROL SYSTEM

BACKGROUND OF THE INVENTION

1. Field of the Invention

The present invention pertains to the operation of a fuel processor and, more particularly, to the identification of a firstout shutdown condition in a fuel processor.

2. Description of the Related Art

Fuel cell technology is an alternative energy source for more conventional energy sources employing the combustion of fossil fuels. A fuel cell typically produces electricity, water, and heat from a fuel and oxygen. More particularly, fuel cells provide electricity from chemical oxidation-reduction reactions and possess significant advantages over other forms of power generation in terms of cleanliness and efficiency. Typically, fuel cells employ hydrogen as the fuel and oxygen as the oxidizing agent. The power generation is proportional to the consumption rate of the reactants.

A significant disadvantage which inhibits the wider use of fuel cells is the lack of a widespread hydrogen infrastructure. Hydrogen has a relatively low volumetric energy density and is more difficult to store and transport than the hydrocarbon fuels currently used in most power generation systems. One way to overcome this difficulty is the use of "fuel processors" or "reformers" to convert the hydrocarbons to a hydrogen rich gas stream which can be used as a feed for fuel cells. Hydrocarbon-based fuels, such as natural gas, LPG, gasoline, and diesel, require conversion processes to be used as fuel sources for most fuel cells. Current art uses multi-step processes combining an initial conversion process with several clean-up processes. The initial process is most often steam reforming ("SR"), autothermal reforming ("ATR"), catalytic partial oxidation ("CPOX"), or non-catalytic partial oxidation ("POX"). The clean-up processes are usually comprised of a combination of desulfurization, high temperature water-gas shift, low temperature water-gas shift, selective CO oxidation, or selective CO methanation. Alternative processes include hydrogen selective membrane reactors and filters.

Thus, many types of fuels can be used, some of them hybrids with fossil fuels, but the ideal fuel is hydrogen. If the fuel is, for instance, hydrogen, then the combustion is very clean and, as a practical matter, only the water is left after the dissipation and/or consumption of the heat and the consumption of the electricity. Most readily available fuels (e.g., natural gas, propane and gasoline) and even the less common ones (e.g., methanol and ethanol) include hydrogen in their molecular structure. Some fuel cell implementations therefore employ a "fuel processor" that processes a particular fuel to produce a relatively pure hydrogen stream used to fuel the fuel cell.

Fuel processor designs are typically highly involved. Typically, a substantial number of subsystems interact in a complicated manner to produce the hydrogen for the fuel cell. For instance, a fuel processor might mix water, air, and a fuel, and reform the mixture. Thus, the fuel processor may have a separate subsystems directed to delivering the water, air, and fuel to a mixing subsystem to produce the process feed gas. Quantities, pressures, and temperatures of the water, air, fuel, and process feed gas are controlled during the mixing process to achieve a desired composition for the process feed gas and prepare it for reforming. The mixing subsystem then delivers the process feed gas to a reforming subsystem in a controlled manner. The reforming process itself constitutes several smaller processes, each of which may occur at a different temperature and pressure.

Any one of these quantities, pressures, temperatures, etc. may generate an error condition in the operation of the fuel processor for a host of reasons. Some of these error conditions may warrant shutting down the fuel processor until it can be corrected, i.e., a "shutdown." A fuel processor typically includes a control system that monitors these types of parameters for error conditions and shuts down the fuel processor. Upon shutdown, an operator or a maintenance technician ascertains the cause of the shutdown, corrects the problem, and then the fuel processor is brought back into operation.

The involved design of the fuel processor frequently spawns a difficult problem in this context. A shutdown is usually initiated by a single shutdown error condition. This condition is referred to as the "firstout." However, the effects of the firstout typically propagate through the fuel processor very quickly, triggering other shutdown error conditions. Consequently, by the time the fuel processor is shut down, there may be very many shutdown error conditions present. The operator or maintenance technician must then wade through all these error to determine which was the firstout in order to correct the problem. The process of the determining which of the shutdown error conditions was the first out can be long and costly.

The present invention is directed to resolving, or at least reducing, at least one of the problems mentioned above.

SUMMARY OF THE INVENTION

A method and apparatus for determining which condition in a fuel processor has initiated a shutdown of the fuel processor are disclosed. In general, the apparatus generates a plurality of shutdown initiator signals, each corresponding to one of a plurality of shutdown conditions and indicating whether such condition is present. The shutdown initiator signals are read within a predetermined window. At least one of the read shutdown initiator signals indicates that a corresponding first shutdown condition has occurred and identifies the corresponding first shutdown condition as the firstout. The apparatus includes, in various aspects, a controller implemented in a computing apparatus that is programmed to perform the method and a program storage medium encoded with instructions that, when executed, perform the method.

BRIEF DESCRIPTION OF THE DRAWINGS

The invention may be understood by reference to the following description taken in conjunction with the accompanying drawings, in which like reference numerals identify like elements, and in which.

While the invention is susceptible to various modifications and alternative forms, the drawings illustrate specific embodiments herein described in detail by way of example. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

Figure 1:
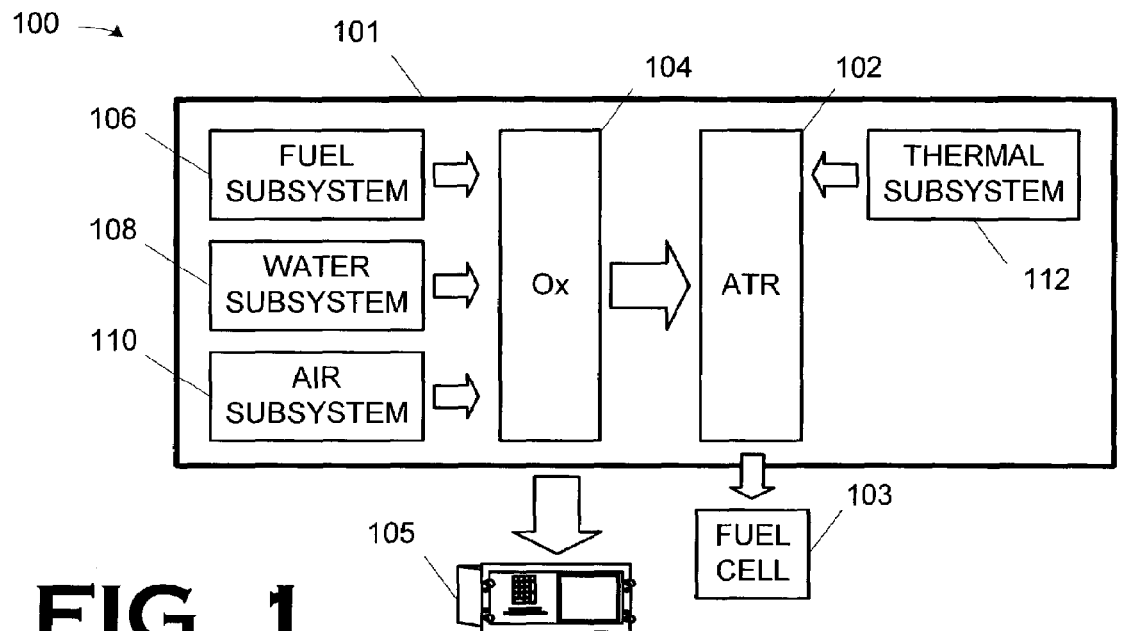
FIG. 1 illustrates one particular embodiment of a fuel processor assembled and operated in accordance with the present invention.

FIG. 1 illustrates one embodiment of an apparatus 100 assembled and operated in accordance with the present invention. The apparatus 100 comprises a fuel processor 101, a fuel cell 103, and a computing device 105. In the illustrated embodiment, the fuel cell 103 is a Proton Exchange Membrane ("PEM") fuel cell, but other types of fuel cells may be used. The invention is not limited by the implementation of the fuel cell 103. More particularly, in the illustrated embodiment, the fuel processor 100 comprises several modular physical subsystems, namely:

- an autothermal reformer ("ATR") 102 that performs the oxidation-reduction reaction that reforms the fuel input to the fuel processor 100 into a reformate gas for a fuel cell 103;
- an oxidizer ("Ox"), which in the illustrated embodiment is an anode tailgas oxidizer ("ATO"), 104 that mixes steam, fuel, and air to create a fuel mixture delivered as a process feed gas to the ATR 102;
- a fuel subsystem 106, that delivers an input fuel (natural gas, in the illustrated embodiment) to the oxidizer 104 for mixing into the process feed gas delivered to the ATR 102;
- a water subsystem 108, that delivers water to the oxidizer 104 for mixing into the process feed gas delivered to the ATR 102;
- an air subsystem 110, that delivers air to the oxidizer 104 for mixing into the process feed gas delivered to the ATR 102; and
- a thermal subsystem 112, that controls temperatures in the operation of the ATR 102 in a manner described further below.

Note that any hydrocarbon may be used for a fuel. Particular implementations of the ATR 102 and oxidizer 104 are illustrated in FIG. 2A, FIG. 2B.

Figure 2A:
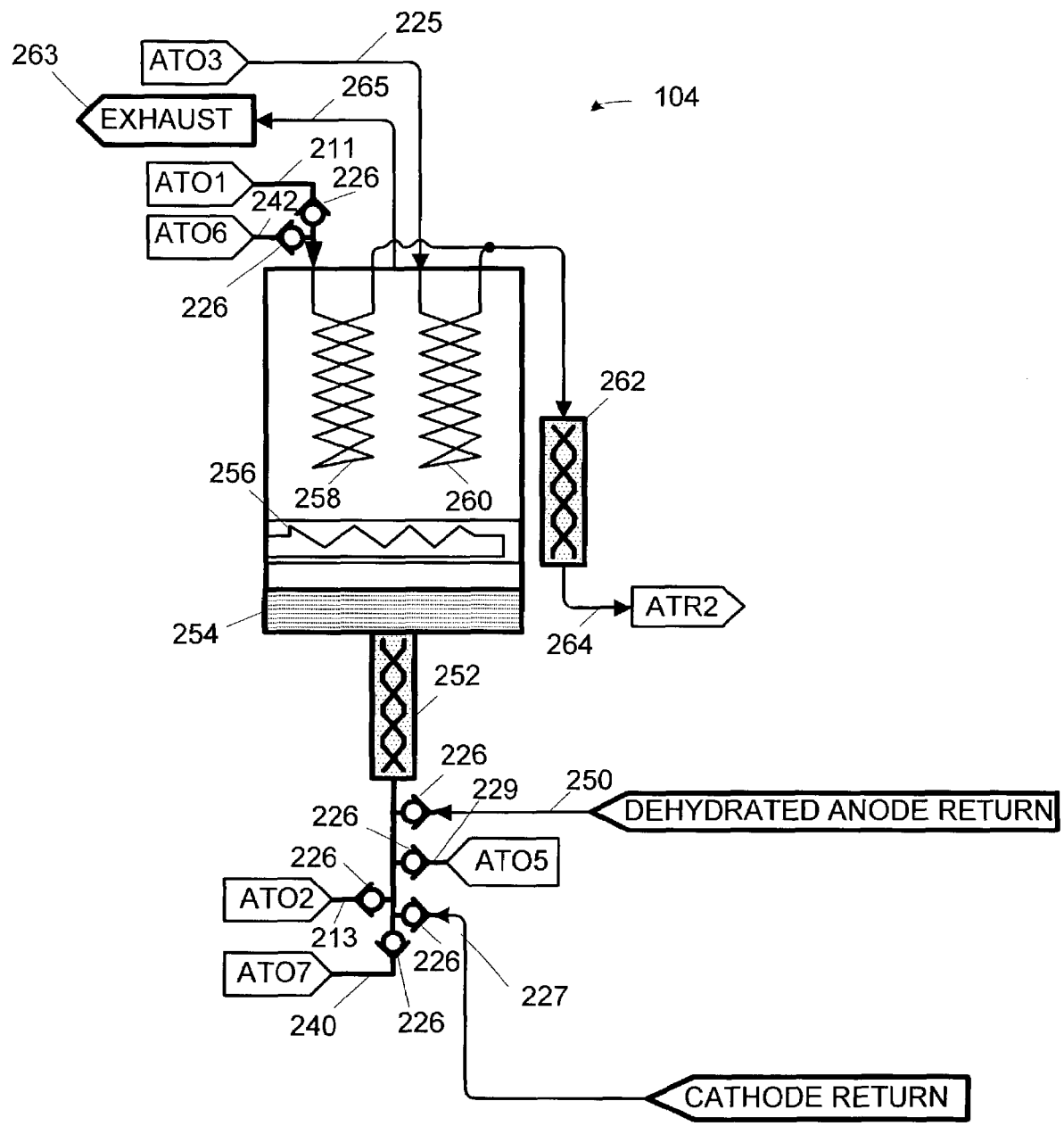
FIG. 2A-FIG. 2B detail the anode tailgas oxidizer and the autothermal reformer of the fuel processor in FIG. 1.

FIG. 2A depicts one particular implementation of the oxidizer 104. The oxidizer 104 receives fuel, water, and air through the feeds ATO2, ATO4, ATO5, ATO7 via the lines 213, 227, 223, 240, respectively, from the fuel subsystem 106, water subsystem 108, the air subsystem 110, and the ATR 102 through a plurality of check valves 226. The reformate gas feed ATO5 is from a water separation system (discussed below) associated with the ATR 102. Exhaust from the anode (not shown) of the fuel cell 103 is returned to a water separator 248 (shown in FIG. 2B), that separates out the water that is drained via the solenoid valve 206 to the drain pain 219 (also shown in FIG. 2B) and supplied to the oxidizer 104 through the line 229. The fuel, air, and dehydrated anode return are then mixed in the mixer 252, before introduction to the tank 254 of the oxidizer 104. The resultant mixture is then heated by the electric heater 256.

Still referring to FIG. 2A, the oxidizer 104 also receives fuel, water, and air from the fuel subsystem 106, the water subsystem 108, and the air subsystem 110 through the feeds ATO1, ATO6, ATO3 over the lines 211, 242, and 225, described above. The lines 211 and 242 are protected by check valves 226. Air and fuel received over the lines 211 and 242 enter the enclosed coil 258. Water received over the line 225 enters the enclosed coil 260. The heated air and fuel mixture in the tank 254 heats the contents of the enclosed coils 258, 260, which are then mixed in the mixer 262 and provided to the ATR 102 through the feed ATR2 over the line 264. The oxidizer 104 is vented to an exhaust 263 through a line 265.

Figure 2B:
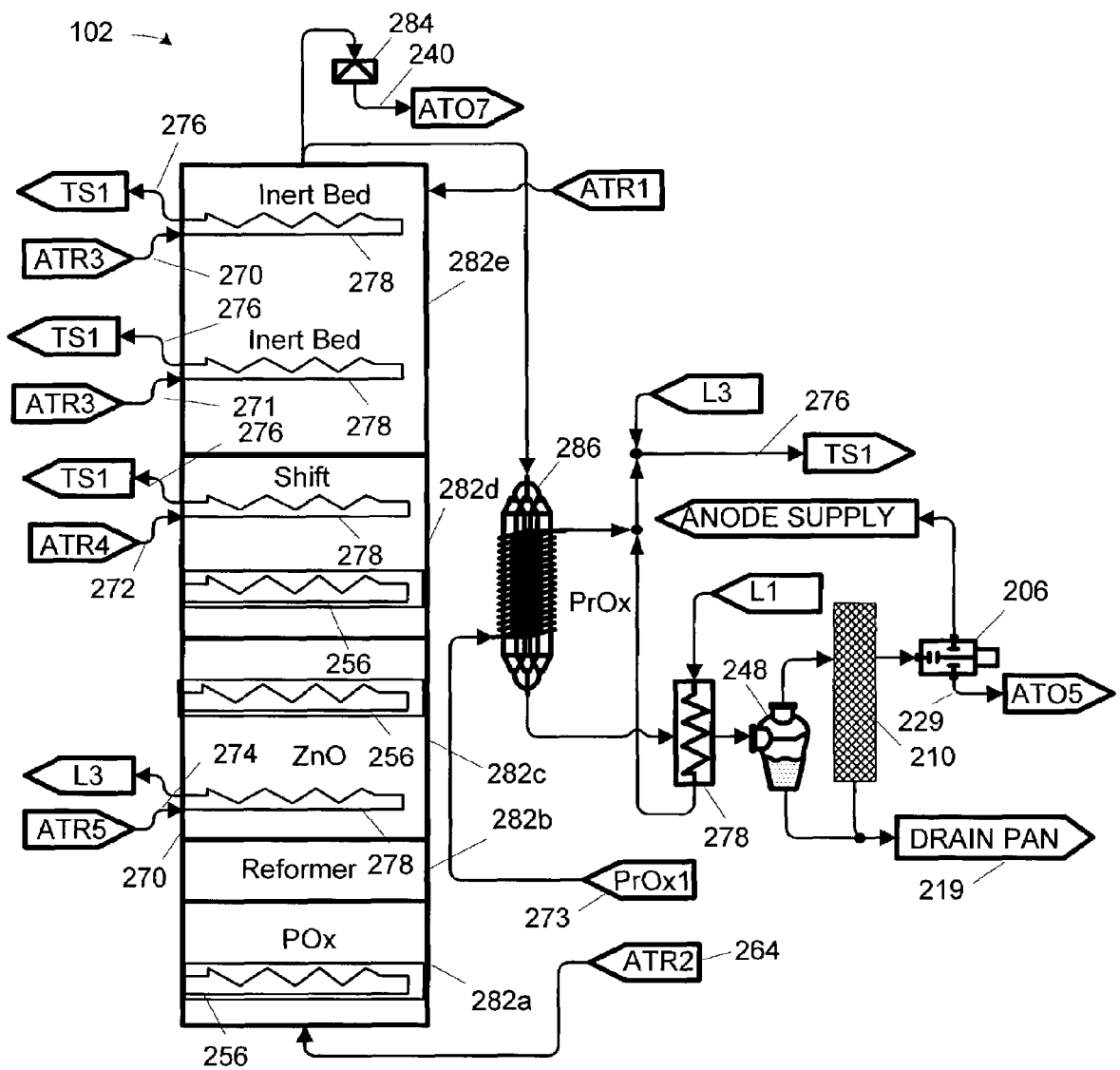

FIG. 2B depicts one particular implementation of the ATR 102. The ATR 102 comprises several stages 282a-282e, including numerous heat exchangers 278 and electric heaters 256. Each of the heat exchangers 278 receives temperature controlled water from the thermal subsystem 112 over the lines 270-273 and returns it over the lines 276 and the feed TS1. The exception are the heat exchangers 278 in the Preferential Oxidizer ("PrOx") 286, which receives the (not shown) from the thermal subsystem 112 over the line 274 and returns it to a water separator 248. Note that air from the water separator 248 is, in the illustrated embodiment, provided to the anode supply for the fuel cell. Byproduct from the operation of the ATR 102 is returned to the oxidizer 104 through a burst disk 284 and a feed ATO7 in the line 250 and to the PrOx 286. The illustrated embodiment also includes a burst disk 284 that, when the ATR 102 overpressures, bursts so that the content of the ATR 102 is dumped to the oxidizer 104 via the line 240 and the feed ATO7.

Figure 3A:
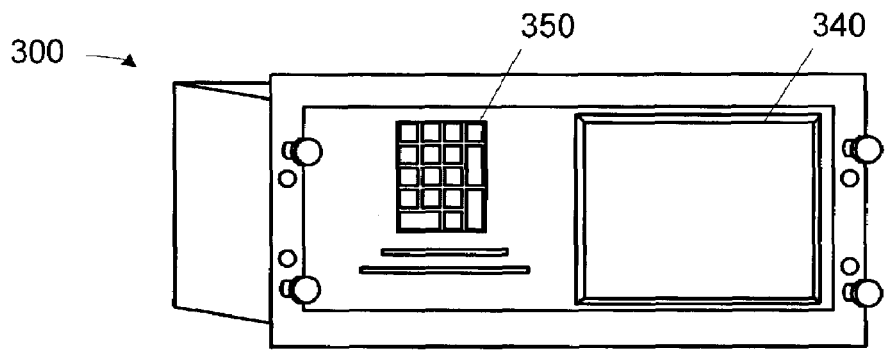
FIG. 3A and FIG. 3B conceptually illustrate a computing apparatus as may be used in the implementation of one particular embodiment of the present invention.
Figure 3B:
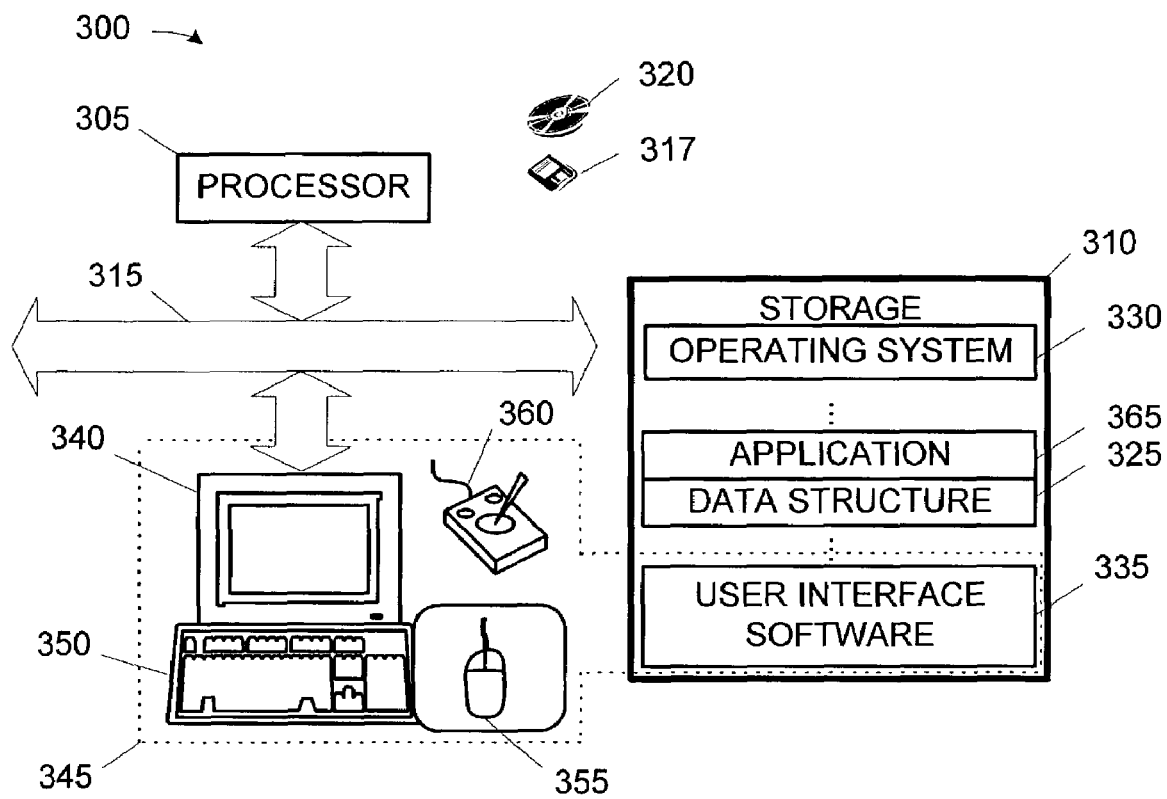

One particular implementation 300 of the computing apparatus 105, first shown in FIG. 1, is illustrated in FIG. 3A and FIG. 3B. The implementation 300 is rack-mounted, but need not be rack-mounted in all embodiments. Indeed, this aspect of any given implementation is not material to the practice of the invention. The computing apparatus 300 may be implemented as a desktop personal computer, a workstation, a notebook or laptop computer, an embedded processor, or the like.

The computing apparatus 300 illustrated in FIG. 3A and FIG. 3B includes a processor 305 communicating with storage 310 over a bus system 315. The storage 310 may include a hard disk and/or random access memory ("RAM") and/or removable storage such as a floppy magnetic disk 317 and an optical disk 320. The storage 310 is encoded with a data structure 325 storing the data set acquired as discussed above, an operating system 330, user interface software 335, and an application 365. The user interface software 335, in conjunction with a display 340, implements a user interface 345. The user interface 345 may include peripheral I/O devices such as a key pad or keyboard 350, a mouse 355, or a joystick 360. The processor 305 runs under the control of the operating system 330, which may be practically any operating system known to the art. The application 365 is invoked by the operating system 330 upon power up, reset, or both, depending on the implementation of the operating system 330. In the illustrated embodiment, the application 365 is used to implement certain aspects of the present invention in a manner described more fully below. Note that the peripheral I/O devices can be used to implement a remote emergency shutdown switch for the fuel processor 100.

Returning to FIG. 1, as previously mentioned, the present invention monitors signals indicating the state of the fuel processor 101 to determine whether shutdown conditions have occurred and, if so, to identify the firstout shutdown condition. In general, the fuel processor 101 generates a plurality of shutdown initiator signals in accordance with conventional practice, each corresponding to one of a plurality of shutdown conditions and indicating whether such condition is present. The computing apparatus 105 reads the shutdown initiator signals within a predetermined window. If a shutdown error condition has occurred, the computing apparatus detects, within the predetermined time window, that at least a first one of the read shutdown initiator signals indicates that a corresponding first shutdown condition has occurred. The computing apparatus 105 then identifies the corresponding first shutdown condition as the firstout.

Figure 4:
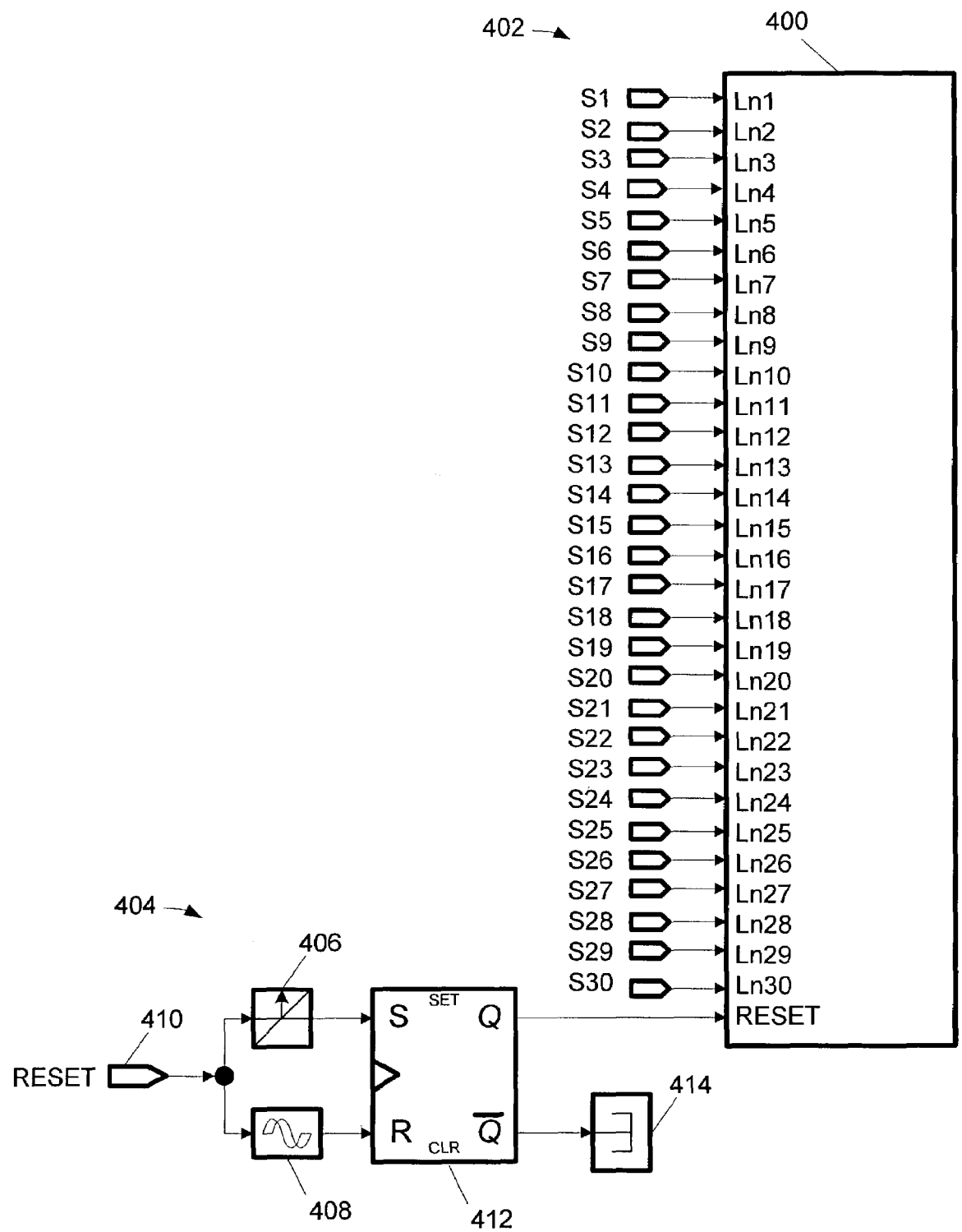
FIG. 4 illustrates in a block diagram a firstout functional block and a plurality of shutdown initiator signals implemented in one particular embodiment of the present invention.

FIG. 4 illustrates in a block diagram a firstout functional block 400 and a plurality of shutdown initiator signals 402 implemented in one particular embodiment of the present invention. The shutdown initiator signals 402 are Boolean signals and each corresponds to a condition that can initiate a shutdown. The shutdown initiator signals 402 can be generated in accordance with conventional practice. In the illustrated embodiment, 30 shutdown initiator signals 402, individually denominated S1-S30, are monitored. In theory, any number of initiator signals 402 may be monitored. Thus, the invention is not limited by the number of shutdown initiator signals being monitored. However, as those skilled in the art will appreciate, there are practical limitations on the number. Most implementations will therefore monitor no more than about 30. The initiator signals 402 monitored in the illustrated embodiment are identified in Table 1 below, which also contains a definition of those signals.

TABLE 1

Firstout Signals

| Signal | Signal Name | Signal Definition |
|---|---|---|
| S1 | Low_NgInlet_Pressure | A low fuel pressure to the oxidizer 104 from the fuel subsystem 106. |
| S2 | High_NgInlet_Pressure | A high fuel pressure to the oxidizer 104 from the fuel subsystem 106. |
| S3 | High_Tgc_Bottom_Temperature | High oxidizer 104 heater temperature. |
| S4 | High_Tgc_Mid_Temperature | High oxidizer 104 middle bed temperature. |
| S5 | High_Tgc_UpMid_Temperature | High ATO upper bed temperature. |
| S6 | High_Tgc_Top_Temperature | High ATO top bed temperature. |
| S7 | High_Tgc_Shell_Temperature | High ATO top skin temperature for the exterior surface of the oxidizer 104. |
| S8 | High_ATR_Inlet_Temperature | A high temperature on the inlet to the ATR 102 in the section 282a. |
| S9 | High_ATR_Exit_Temperature | A high temperature on the exit from the ATR 102 section 282d. |
| S10 | High_PrOx_Exit_Temperature | A high temperature on the exit from the PrOx 286. |
| S11 | High_ZnOBed_Outlet_Temperature | A high temperature on the exit from the Zinc Oxide bed 282c. |
| S12 | High_Reactor_Shell_Temperature | A high temperature in the reactor shell for the ATR 102. |
| S13 | Low_Rfmt_Delivery_Pressure | A low pressure for the delivery of a reformate to the fuel cell 103. |
| S14 | Low_ATO_Temperature | A low temperature for the oxidizer 104. |
| S15 | ATO_LightOff_Failed | ATO light off timer expired, i.e., catalyst reaction did not occur within a sufficient period of time following introduction of catalyst components. |
| S16 | High_Shift_Temperature | A high temperature for the shift process in the bed 282d of the ATR 102. |
| S17 | Control_EStop | Remote control emergency switch activated. |
| S18 | Emergency_Stop_Switch | An emergency stop switch has been thrown. |
| S19 | Control_Stop_Switch | A control stop switch has been thrown. |
| S20 | PowerOff | Power has been turned off to the system. |
| S21 | Gas_Detected_InCabinet | Gas has been detected in the cabinet of the fuel processor 100. |
| S22 | Panel_Stop_Switch | A stop switch on the control panel has been thrown. |
| S23 | Signal 23 | Reserved |
| S24 | Signal 24 | Reserved |
| S25 | Signal 25 | Reserved |
| S26 | Signal 26 | Reserved |
| S27 | Signal 27 | Reserved |
| S28 | Signal 28 | Reserved |
| S29 | Signal 29 | Reserved |
| S30 | Signal 30 | Reserved |

The shutdown initiator signals 402 are scanned every 50 milliseconds, or so. The precise interval between scans is a function of processor speed, and so does not limit the scope of the invention. The 50 millisecond period is a function of the operational frequency of the processor 305 (shown in FIG. 3B), and also defines a predetermined window in which each scan occurs. Thus, in the illustrated embodiment, every 50 milliseconds the processor 305 reads all the shutdown initiator signals 402 within a 50 millisecond window.

If a given shutdown initiator signal 402 is "ON" when scanned, it indicates that the corresponding shutdown condition has occurred and that the system is to be shut down. The firstout functional block 400 identifies the corresponding condition of any shutdown initiator signal that is "ON" during a scan as a firstout condition. Note that, in some circumstances, more than one of the shutdown initiator signals 402 may be "ON" in the same scan. In that case, one of the shutdown initiator signals 402 that is "ON" is identified as the firstout even though multiple firstout conditions may be present. The information regarding the other "ON" shutdown initiator signals 402 is also saved, however, for reporting and analysis. While identifying and reporting multiple firstout conditions may not be as desirable as identifying only a single firstout, it is still preferable to identifying none at all, or even a number as large as thirty. Thus, the invention is not limited to identifying only a single firstout condition. However, as a corollary, it is generally desirable to employ processors with higher operational frequencies that, as a consequence, generate scans more frequently.

Figure 5:
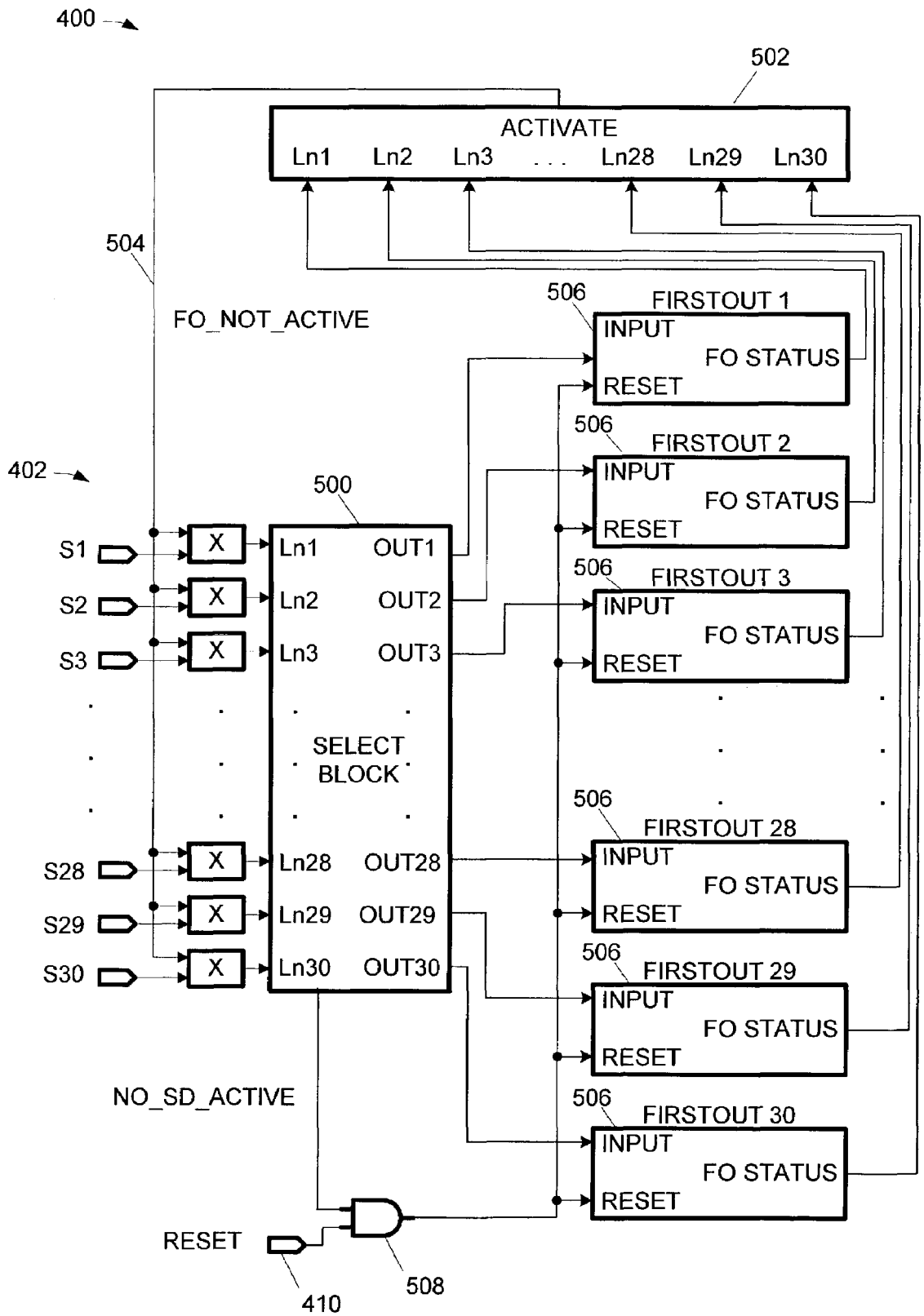
FIG. 5 depicts the internal structure of the firstout functional block first shown in FIG. 4, including a select block and an activate block.

FIG. 5 depicts the internal structure of the firstout functional block 400 first shown in FIG. 4, including a select block 500, an activate block 502, and a plurality of latches 506 that latch the output of the select block 500 until reset. The select block 500 receives the input shutdown initiator signals 402 and "selects" the one (or more), if any, that are active "ON" during a scan. The activate block 502 disables the select block 500 when a shutdown initiator signal 402 is detected "ON" until such time as the system is reset. The structure and operation of the select block 500 and the activate block 502 are illustrated in FIG. 6A and FIG. 6B and FIG. 7, respectively.

Figure 6A:
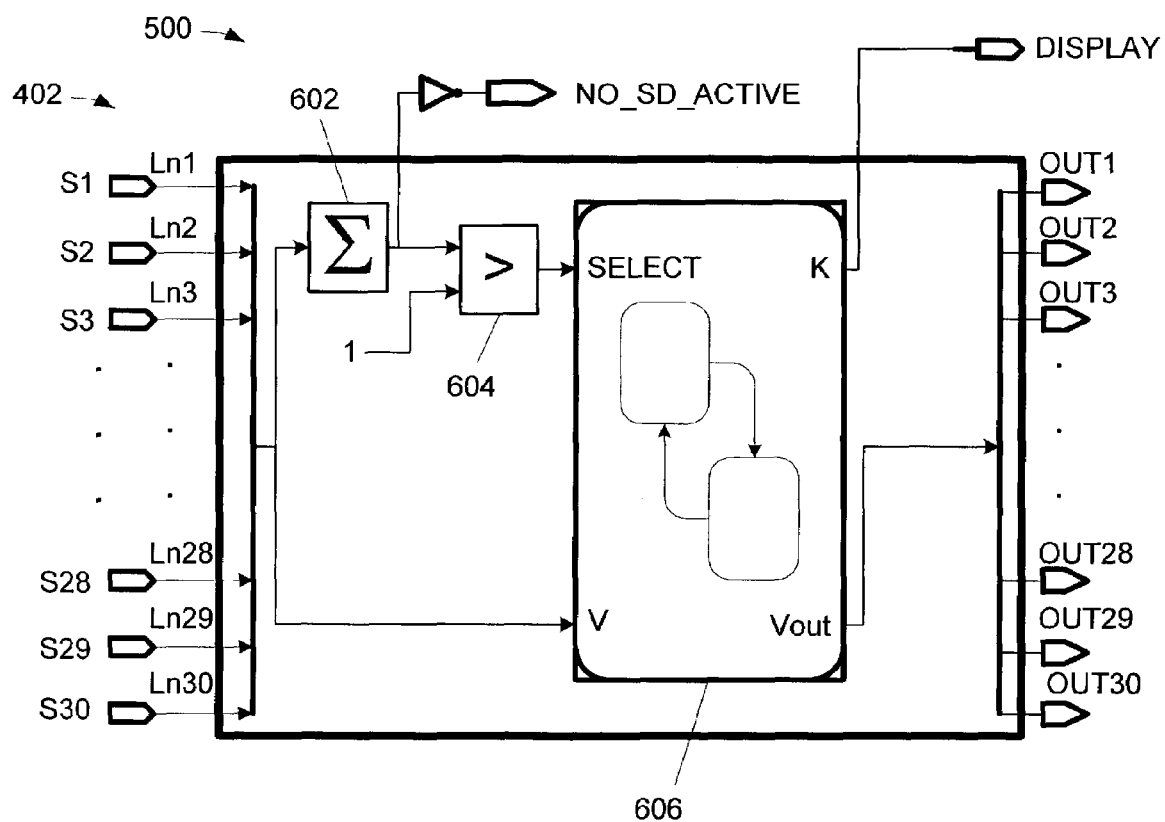
FIG. 6A and FIG. 6B illustrate the reading logic of the select block first shown in FIG. 5.
Figure 6B:
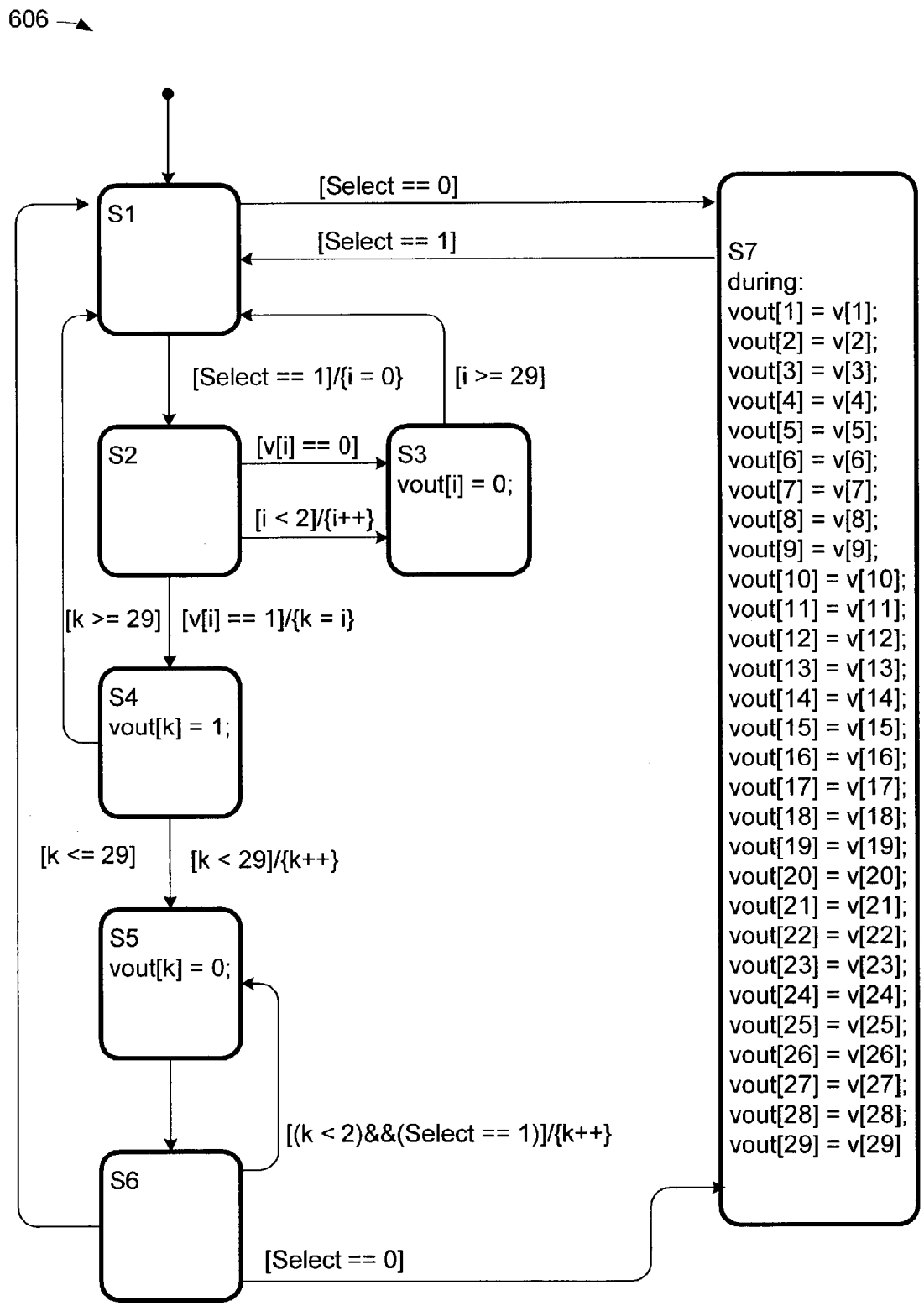
Figure 7:
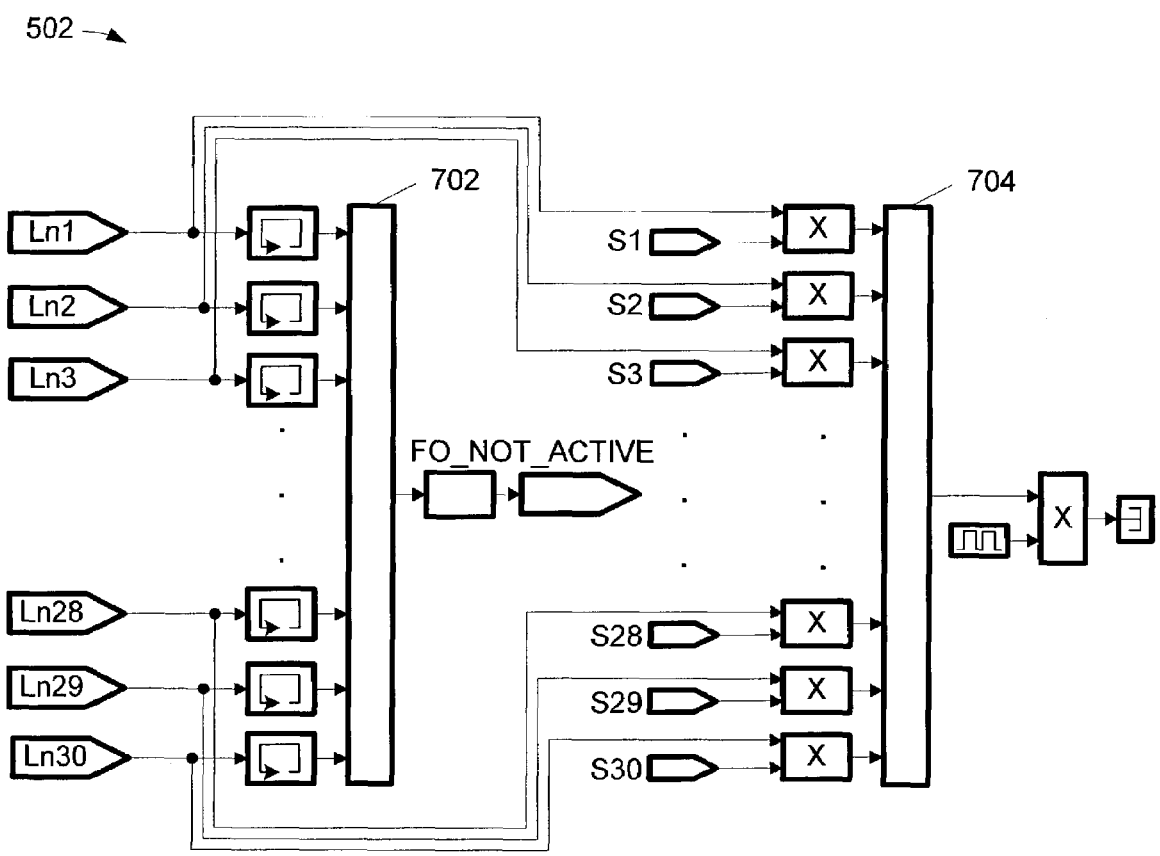
FIG. 7 depicts the internal logic of the activate block first shown in FIG. 5.

FIG. 6A and FIG. 6B illustrate the reading logic of the select block 500 first shown in FIG. 5. The shutdown initiator signals 402 shown in FIG. 6A have already been multiplied by the FO_NOT_ACTIVE signal of the activate block 502 as shown in FIG. 5. The shutdown initiator signals 402 are then summed by the summer 602. The sum is inverted and output as the signal NO_SD_ACTIVE to the AND gate 508, shown in FIG. 5, to indicate whether any of the shutdown initiator signals 402 indicate that a shutdown condition has occurred. A comparator 604 then indicates whether the sum is greater than 1 (meaning there is more than one suthdown condition), which indication is input to the functional block 606.

FIG. 6B is a conceptualized state diagram for the functional block 606 first shown in FIG. 6A. In state S1, if SELECT (i.e., the result of the comparison)=0, then the functional block 606 begins reading the shutdown initiator signals 402, If none of the shutdown initiator signals 402 indicate a shutdown error condition has occurred, the functional block 606 enters state S7 and passes through the shutdown initiator signals 402 as output. If any shutdown initiator signal 402 indicates that a shutdown error condition has occurred, it is marked as the firstout and the remaining shutdown initiator signals 402 are passed through.

Because the effects of the firstout can propagate quickly to generate additional shutdown error conditions, it is possible that two or more shutdown initiator signals 402 may be found to indicate a shutdown error condition in the same scan. This event is indicated when SELECT=1 (i.e., the sum of the shutdown initiator signals 402>1). The functional block 606 reads through the shutdown initiator signals 402 to see which indicates that a shutdown error condition has occurred. The functional block 606 reads the signals in states S2 and S3, and identifies the first shutdown initiator signal 402 indicating the corresponding shutdown error condition has occurred as the "firstout." The functional block then proceeds through states S5 and S6 to read the remaining shutdown initiator signals 402 indicate that their corresponding shutdown error has also occurred. The information from these shutdown initiator signals 402 is also saved, but they are not marked as the "firstout." Note that this algorithm will not necessarily detect the true firstout, but it will reduce the number of shutdown error conditions that must be investigated as the firstout.

FIG. 7 depicts the internal logic of the activate block 502 first shown in FIG. 5. An OR function block 702 detects if any of the latches 506 has latched a valued and disables the FO_NOT_ACTIVE signal, thus holding the last shutdown signal value until reset. A second OR function block 704 assigns decimal number to each shutdown signal, thus allowing separate text message assignment to each. For example, the second OR function block 704 assigns the shutdown initiator signal S2 the text message "High Natural Gas Inlet Pressure Initiated Shutdown of the System."

Returning to FIG. 5, each shutdown initiator signal 402 has a corresponding latch 506. Each latch 506 contains Set-Reset flip-flop that latches the firstout signal coming out of the select block 500. The latches 506 lock the ON signal even if it happens spuriously and then disappears. For example, if a shutdown initiator signal is ON and than immediately OFF, such as for a spike in the pressure on the vessel. Without the latches 506, the select block 500 will discard active signal after it disappears, thus losing information an operator may be able to read only hours after it occurred.

Returning now to FIG. 4, the logic 404 by which the state of the firstout function block 400 may be reset is also shown. Once a firstout condition is detected, the firstout function block 400 remains in that state until reset via the logic 404. The logic 404 includes elements 406, 408 that represent a Hit crossing and a transport delay, respectively. The logic 404 receives a "RESET" signal 410 from, e.g., a reset switch (not shown). The S-R flip-flop 412 latches the "RESET" signal and outputs it to the activate block 400 through its non-inverted output. The inverted output is terminated by the terminator 414.

The functionality of the select block 500 is enabled if the firstout functional block 400 is not locked and waiting to be reset. The illustrated embodiment enables this functionality by multiplying a FO_NO_ACTIVE signal received over the line 504. The FO_NO_ACTIVE signal is generated by the activate block 502, which receives as inputs the firstout status of each corresponding condition from the latches 506. If at least one of the shutdown indicator signals 402 is "ON" during the scan, this is propagated by the select block 500 through the latches 506 to the activate block 502, which is then disabled until a reset signal 410, first shown in FIG. 4, is received.

The elements of FIG. 4, FIG. 5, FIG. 6A, FIG. 6B, and FIG. 7 are described in terms of "functional blocks," "flip-flops," and other logic circuits. These elements may, in some embodiments, be implemented in hardware. However, as those in the art having the benefit of this disclosure will appreciate, such functionality may frequently be implemented in either hardware or software. The choice may result from design constraints, economic constraints, or even the personal preference of the designer. In the illustrated embodiment, these elements are implemented in code emulating the operation of logic circuits. Thus, reference to a "functional block" or a "flip-flop" is, for the illustrated embodiment, reference to a block or section of code in, for instance, the application 365 (shown in FIG. 3B) that emulates the function of such a hardware element. However, alternative embodiments may choose to actually implement this functionality in hardware as initially described.

Thus, at least some aspects of the present invention will typically be implemented as software on an appropriately programmed computing device, e.g., the computing apparatus 300 in FIG. 3A, FIG. 3B. The instructions may be encoded on, for example, the storage 310, the floppy disk 317, and/or the optical disk 320. The present invention therefore includes, in one aspect, a computing apparatus programmed to perform the method of the invention. In another aspect, the invention includes a program storage device encoded with instructions that, when executed by a computing apparatus, perform the method of the invention.

Some portions of the detailed descriptions herein are consequently presented in terms of a software implemented process involving symbolic representations of operations on data bits within a memory in a computing system or a computing device. These descriptions and representations are the means used by those in the art to most effectively convey the substance of their work to others skilled in the art. The process and operation require physical manipulations of physical quantities. Usually, though not necessarily, these quantities take the form of electrical, magnetic, or optical signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantifies. Unless specifically stated or otherwise as may be apparent, throughout the present disclosure, these descriptions refer to the action and processes of an electronic device, that manipulates and transforms data represented as physical (electronic, magnetic, or optical) quantities within some electronic device's storage into other data similarly represented as physical quantities within the storage, or in transmission or display devices. Exemplary of the terms denoting such a description are, without limitation, the terms processing, "computing," "calculating," "determining," "displaying," and the like.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method for determining which condition in a fuel processor has initiated a shutdown of the fuel processor, comprising:

generating a plurality of shutdown initiator signals, each corresponding to one of a plurality of shutdown conditions and indicating whether such condition is present wherein the shutdown initiator signals include signals indicating at least one of an undesired temperature, an undesired pressure, an undesired concentration, a low fuel pressure, a high fuel pressure, a high anode tailgas oxidizer heater temperature, a high anode tailgas oxidizer inlet temperature, high anode tailgas oxidizer mid bed temperature, a high anode tailgas oxidizer top bed temperature, a high anode tailgas oxidizer top skin temperature, a high temperature on the inlet to an autothermal reformer, a high temperature on an exit from the autothermal reformer, a high temperature on the exit from a preferential oxidizer, a high temperature on an exit from a Zinc Oxide bed, a high temperature in a reactor shell for the autothermal reformer, a low pressure for the delivery of a process feed gas to the autothermal reformer, a low temperature for an anode tailgas oxidizer, an anode tailgas oxidizer light off timer expired, a high temperature for a shift process, a remote control emergency switch activated, an emergency stop switch has been thrown, a control stop switch has been thrown, power has been turned off to the system, a gas has been detected in the cabinet of the ATR, and a stop switch on the control panel has been thrown;

reading the shutdown initiator signals within a predetermined window;

detecting within the predetermined time window that at least a first one of the read shutdown initiator signals indicates that a corresponding first shutdown condition has occurred; and identifying the corresponding first shutdown condition as the firstout.

2. The method of claim 1, wherein detecting that the first one of the read shutdown initiator signals indicates that the corresponding first shutdown condition has occurred includes determining that the first one of the shutdown initiator signals is "ON".

3. The method of claim 1, further comprising disabling detection of further shutdown initiator signals in subsequent predetermined time windows indicating that further shutdown conditions have occurred.

4. The method of claim 3, further comprising detecting within the predetermined window that a second one of the shutdown initiator signals indicates that a corresponding second shutdown condition has occurred.

5. The method of claim 4, further comprising storing the information that the second shutdown condition has occurred.

6. The method of claim 1, further comprising at least one of storing the information that the first shutdown condition has occurred and displaying that the first shutdown condition has occurred.

7. A program storage medium encoded with instructions that, when executed by a computer, perform a method for determining which condition in a fuel processor has initiated a shutdown of the fuel processor, comprising:

generating a plurality of shutdown initiator signals, each corresponding to one of a plurality of shutdown conditions and indicating whether such condition is present wherein the shutdown initiator signals include signals indicating at least one of an undesired temperature, an undesired pressure, an undesired concentration, a low fuel pressure, a high fuel pressure, a high anode tailgas oxidizer heater temperature, a high anode tailgas oxidizer inlet temperature, high anode tailgas oxidizer mid bed temperature, a high anode tailgas oxidizer top bed temperature, a high anode tailgas oxidizer top skin temperature, a high temperature on the inlet to an autothermal reformer, a high temperature on an exit from the autothermal reformer, a high temperature on the exit from a preferential oxidizer, a high temperature on an exit from a Zinc Oxide bed, a high temperature in a reactor shell for the autothermal reformer, a low pressure for the delivery of a process feed gas to the autothermal reformer, a low temperature for an anode tailgas oxidizer, an anode tailgas oxidizer light off timer expired, a high temperature for a shift process, a remote control emergency switch activated, an emergency stop switch has been thrown, a control stop switch has been thrown, power has been turned off to the system, a gas has been detected in the cabinet of the ATR, and a stop switch on the control panel has been thrown;

reading the shutdown initiator signals within a predetermined window;

detecting within the predetermined time window that at least a first one of the read shutdown initiator signals indicates that a corresponding first shutdown condition has occurred; and identifying the corresponding first shutdown condition as the firstout.

8. The program storage medium of claim 7, wherein detecting that the first one of the read shutdown initiator signals in the encoded method indicates that the corresponding first shutdown condition has occurred includes determining that the first one of the shutdown initiator signals is "ON".

9. The program storage medium of claim 7, wherein the encoded method further comprises disabling detection of further shutdown initiator signals in subsequent predetermined time windows indicating that further shutdown conditions have occurred.

10. The program storage medium of claim 9, wherein the encoded method further comprises detecting within the predetermined window that a second one of the shutdown initiator signals indicates that a corresponding second shutdown condition has occurred.

11. The program storage medium of claim 10, wherein the encoded method further comprises storing the information that the second shutdown condition has occurred.

12. The program storage medium of claim 7, wherein the encoded method further comprises at least one of storing the information that the first shutdown condition has occurred and displaying that the first shutdown condition has occurred.

13. A computer programmed to perform a method for determining which condition in a fuel processor has initiated a shutdown of the fuel processor, comprising:

generating a plurality of shutdown initiator signals, each corresponding to one of a plurality of shutdown conditions and indicating whether such condition is present wherein the shutdown initiator signals include signals indicating at least one of an undesired temperature, an undesired pressure, an undesired concentration, a low fuel pressure, a high fuel pressure, a high anode tailgas oxidizer heater temperature, a high anode tailgas oxidizer inlet temperature, high anode tailgas oxidizer mid bed temperature, a high anode tailgas oxidizer top bed temperature, a high anode tailgas oxidizer top skin temperature, a high temperature on the inlet to an autothermal reformer, a high temperature on an exit from the autothermal reformer, a high temperature on the exit from a preferential oxidizer, a high temperature on an exit from a Zinc Oxide bed, a high temperature in a reactor shell for the autothermal reformer, a low pressure for the delivery of a process feed gas to the autothermal reformer, a low temperature for an anode tailgas oxidizer, an anode tailgas oxidizer light off timer expired, a high temperature for a shift process, a remote control emergency switch activated, an emergency stop switch has been thrown, a control stop switch has been thrown, power has been turned off to the system, a gas has been detected in the cabinet of the ATR, and a stop switch on the control panel has been thrown;

reading the shutdown initiator signals within a predetermined window;

detecting within the predetermined time window that at least a first one of the read shutdown initiator signals indicates that a corresponding first shutdown condition has occurred; and identifying the corresponding first shutdown condition as the firstout.

14. The programmed computer of claim 13, wherein detecting that the first one of the read shutdown initiator signals in the programmed method indicates that the corresponding first shutdown condition has occurred includes determining that the first one of the shutdown initiator signals is "ON".

15. The programmed computer of claim 13, wherein the programmed method further comprises disabling detection of further shutdown initiator signals in subsequent predetermined time windows indicating that further shutdown conditions have occurred.

16. The programmed computer of claim 15, wherein the programmed method further comprises detecting within the predetermined window that a second one of the shutdown initiator signals indicates that a corresponding second shutdown condition has occurred.

17. The programmed computer of claim 16, wherein the programmed method further comprises storing the information that the second shutdown condition has occurred.

18. The programmed computer claim 13, wherein the programmed method further comprises at least one of storing the information that the first shutdown condition has occurred and displaying that the first shutdown condition has occurred.

19. An apparatus for determining which condition in a fuel processor has initiated a shutdown of the fuel processor, comprising:

means for generating a plurality of shutdown initiator signals, each corresponding to one of a plurality of shutdown conditions and indicating whether such condition is present wherein the shutdown initiator signals include signals indicating at least one of an undesired temperature, an undesired pressure, an undesired concentration, a low fuel pressure, a high fuel pressure, a high anode tailgas oxidizer heater temperature, a high anode tailgas oxidizer inlet temperature, high anode tailgas oxidizer mid bed temperature, a high anode tailgas oxidizer top bed temperature, a high anode tailgas oxidizer top skin temperature, a high temperature on the inlet to an autothermal reformer, a high temperature on an exit from the autothermal reformer, a high temperature on the exit from a preferential oxidizer, a high temperature on an exit from a Zinc Oxide bed, a high temperature in a reactor shell for the autothermal reformer, a low pressure for the delivery of a process feed gas to the autothermal reformer, a low temperature for an anode tailgas oxidizer, an anode tailgas oxidizer light off timer expired, a high temperature for a shift process, a remote control emergency switch activated, an emergency stop switch has been thrown, a control stop switch has been thrown, power has been turned off to the system, a gas has been detected in the cabinet of the WTR, and a stop switch on the control panel has been thrown;

means for reading the shutdown initiator signals within a predetermined window;

means for detecting within the predetermined time window that at least a first one of the read shutdown initiator signals indicates that a corresponding first shutdown condition has occurred; and means for identifying the corresponding first shutdown condition as the firstout.

20. The apparatus of claim 19, wherein the means for detecting that the first one of the read shutdown initiator signals indicates that the corresponding first shutdown condition has occurred includes determining that the first one of the shutdown initiator signals is "ON".

21. The apparatus of claim 19, further comprising means for disabling detection of further shutdown initiator signals in subsequent predetermined time windows indicating that further shutdown conditions have occurred.

22. The apparatus of claim 21, further comprising means for detecting within the predetermined window that a second one of the shutdown initiator signals indicates that a corresponding second shutdown condition has occurred.

23. The apparatus of claim 22, further comprising means for storing the information that the second shutdown condition has occurred.

24. The apparatus of claim 19, further comprising at least one of means for storing the information that the first shutdown condition has occurred and means for displaying that the first shutdown condition has occurred.

25. An apparatus, comprising:
a fuel processor; and
a control system capable of:
generating a plurality of shutdown initiator signals, each corresponding to one of a plurality of shutdown conditions in the fuel processor and indicating whether such condition is present reading the shutdown initiator signals within a predetermined window wherein the shutdown initiator signals include signals indicating at least one of an undesired temperature, an undesired pressure, an undesired concentration, a low fuel pressure, a high fuel pressure, a high anode tailgas oxidizer heater temperature, a high anode tailgas oxidizer inlet temperature, high anode tailgas oxidizer mid bed temperature, a high anode tailgas oxidizer top bed temperature, a high anode tailgas oxidizer top skin temperature, a high temperature on the inlet to an autothermal reformer, a high temperature on an exit from the autothermal reformer, a high temperature on the exit from a preferential oxidizer, a high temperature on an exit from a Zinc Oxide bed, a high temperature in a reactor shell for the autothermal reformer, a low pressure for the delivery of a process feed gas to the autothermal reformer, a low temperature for an anode tailgas oxidizer, an anode tailgas oxidizer light off timer expired, a high temperature for a shift process, a remote control emergency switch activated, an emergency stop switch has been thrown, a control stop switch has been thrown, power has been turned off to the system, a gas has been detected in the cabinet of the ATR, and a stop switch on the control panel has been thrown;
detecting within the predetermined time window that at least a first one of the read shutdown initiator signals indicates that a corresponding first shutdown condition has occurred; and
identifying the corresponding first shutdown condition as the firstout.

26. The apparatus of claim 25, wherein the fuel processor comprises: an autothermal reformer capable of reforming a fuel, air, and steam mixture; an anode tailgas oxidizer capable of mixing a fuel, air, and steam to the gas, air, to create a process feed gas and delivering the process feed gas to the autothermal reformer; a fuel subsystem capable of delivering the fuel to the anode tailgas oxidizer subsystem; a water subsystem capable of delivering water to the anode tailgas oxidizer subsystem; an air subsystem capable of delivering the air to the anode tailgas oxidizer subsystem; and a thermal subsystem capable of managing the operational temperatures of the autothermal reformer and the anode tailgas oxidizer.

27. The apparatus of claim 25, wherein detecting that the first one of the read shutdown initiator signals indicates that the corresponding first shutdown condition has occurred includes determining that the first one of the shutdown initiator signals is "ON".

28. The apparatus of claim 25, wherein the control system is further capable of disabling detection of further shutdown initiator signals in subsequent predetermined time windows indicating that further shutdown conditions have occurred.

29. The apparatus of claim 28, wherein the control system is further capable of detecting within the predetermined window that a second one of the shutdown initiator signals indicates that a corresponding second shutdown condition has occurred.

30. The apparatus of claim 29, wherein the control system is further capable of storing the information that the second shutdown condition has occurred.

31. The apparatus of claim 25, wherein the control system is further capable of at least one of storing the information that the first shutdown condition has occurred and displaying that the first shutdown condition has occurred.

32. The apparatus of claim 25, wherein the control system comprises a computing device programmed to detect the read shutdown initiator signal that indicates that a corresponding first shutdown condition has occurred and identify the corresponding first shutdown condition as the firstout.

33. The apparatus of claim 25, wherein the control system comprises: means for detecting within the predetermined time window that at least a first one of the read shutdown initiator signals indicates that a corresponding first shutdown condition has occurred; and means for identifying the corresponding first shutdown condition as the firstout.

34. The apparatus of claim 33, wherein at least one of the detecting means and the identifying means is implemented in hardware.

35. The apparatus of claim 33, wherein at least one of the detecting means and the identifying means is implemented in hardware.

36. The apparatus of claim 25, wherein the control system comprises: a first out functionality block capable of receiving shutdown initiator signals and determining whether any of the shutdown initiator signals indicates that a firstout error condition has occurred; and a reset for the first out functionality block.

37. The apparatus of claim 36, wherein the firstout functionality block comprises: a select block capable of selecting which of the shutdown initiator signals indicates that a firstout error condition has occurred; a set of latches capable of latching any shutdown initiator signal indicating that a firstout error condition has occurred; and an activate block capable de-activating the select block upon receiving a latched initiator signal indicating that a firstout error condition has occurred from the set of latches until a reset signal is received.

38. The apparatus of claim 36, wherein at least one of the functionality block and the reset is implemented in hardware.

39. The apparatus of claim 36, wherein at least one of the functionality block and the reset is implemented in software.

* * * * *